(12) United States Patent
Greiner et al.

(10) Patent No.: US 10,996,083 B2
(45) Date of Patent: May 4, 2021

(54) SENSOR SYSTEM FOR ATTACHING A SENSOR SET-UP TO A VEHICLE

(71) Applicant: Robert Bosch GmbH, Stuttgart (DE)

(72) Inventors: Alexander Greiner, Reichenbach (DE); Michael Zoeller, Beilstein (DE); Mirko Hattass, Stuttgart (DE); Romy Wein, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 190 days.

(21) Appl. No.: 16/270,043

(22) Filed: Feb. 7, 2019

(65) Prior Publication Data
US 2019/0250017 A1     Aug. 15, 2019

(30) Foreign Application Priority Data
Feb. 15, 2018   (DE) .................. 102018202303.4

(51) Int. Cl.
| | | |
|---|---|---|
| *F28D 15/02* | (2006.01) | |
| *G01D 11/24* | (2006.01) | |
| *G01S 7/48* | (2006.01) | |
| *G01S 7/02* | (2006.01) | |
| *G01S 7/52* | (2006.01) | |
| *G01S 15/931* | (2020.01) | |
| *G01S 17/931* | (2020.01) | |
| *G01S 13/931* | (2020.01) | |

(52) U.S. Cl.
CPC ........ *G01D 11/245* (2013.01); *F28D 15/0275* (2013.01); *G01S 7/02* (2013.01); *G01S 7/48* (2013.01); *G01S 7/52* (2013.01); *G01S 15/931* (2013.01); *G01S 17/931* (2020.01); *G01S 13/931* (2013.01); *G01S 2007/027* (2013.01); *G01S 2013/9323* (2020.01); *G01S 2013/9324* (2020.01); *G01S 2013/9327* (2020.01); *G01S 2015/937* (2013.01)

(58) Field of Classification Search
CPC ..... G01S 7/02; G01S 7/48; G01S 7/52; G01S 13/931; G01S 15/931; G01S 17/931; G01S 2007/027; G01S 2013/9323; G01S 2013/9327; G01S 2015/937; G01D 11/245; F28D 15/0275
See application file for complete search history.

(56) References Cited

U.S. PATENT DOCUMENTS

| | | | | |
|---|---|---|---|---|
| 4,169,387 A | * | 10/1979 | Krempl | .................. G01D 3/028 165/104.26 |
| 4,921,039 A | * | 5/1990 | Ghiraldi | .............. F28D 15/0266 165/104.19 |

(Continued)

FOREIGN PATENT DOCUMENTS

| | | |
|---|---|---|
| DE | 10160935 A1 | 7/2003 |
| DE | 102010064343 A1 | 7/2012 |

*Primary Examiner* — David J Bolduc
(74) *Attorney, Agent, or Firm* — Norton Rose Fulbright US LLP; Gerard Messina

(57) ABSTRACT

A sensor system for attaching a sensor set-up to a vehicle, including the sensor set-up having a housing and a sensor; a connecting assembly mountable to the vehicle, the sensor set-up being fastened to the connecting assembly, the sensor set-up being adjustable by at least one degree of freedom with respect to the connecting assembly; and at least one heat pipe, which connects the sensor set-up and the connecting assembly in a thermally conductive manner.

17 Claims, 3 Drawing Sheets

(56) References Cited

U.S. PATENT DOCUMENTS

| | | | | |
|---|---|---|---|---|
| 5,077,637 A * | 12/1991 | Martorana | H05K 7/20545 | 361/717 |
| 5,515,341 A * | 5/1996 | Toda | B06B 1/0688 | 367/140 |
| 5,925,929 A * | 7/1999 | Kuwahara | H01L 23/427 | 257/714 |
| 6,104,611 A * | 8/2000 | Glover | H05K 7/20336 | 361/700 |
| 6,215,661 B1 * | 4/2001 | Messenger | H05K 7/20418 | 165/185 |
| 6,307,142 B1 * | 10/2001 | Allen | H01L 35/02 | 136/205 |
| 8,934,235 B2 * | 1/2015 | Rubenstein | F28D 15/0275 | 361/679.47 |
| 8,998,048 B1 * | 4/2015 | Wu | F16M 13/00 | 224/420 |
| 9,786,578 B2 * | 10/2017 | Cox | H05K 7/20509 | |
| 10,298,817 B1 * | 5/2019 | Schlupf | H04N 5/22521 | |
| 10,429,495 B1 * | 10/2019 | Wang | G01S 7/4815 | |
| 10,543,906 B1 * | 1/2020 | Graber | B64D 33/08 | |
| 10,578,716 B1 * | 3/2020 | Hu | G01S 7/4813 | |
| 2004/0069462 A1 * | 4/2004 | Hashimoto | F28D 15/046 | 165/104.26 |
| 2005/0022402 A1 * | 2/2005 | Ash | E21B 47/022 | 33/321 |
| 2005/0061484 A1 * | 3/2005 | Hendricks | F28D 15/0275 | 165/104.21 |
| 2007/0047206 A1 * | 3/2007 | Lee | H01L 23/467 | 361/703 |
| 2007/0187069 A1 * | 8/2007 | Ueno | H01L 23/427 | 165/80.3 |
| 2007/0257181 A1 * | 11/2007 | Dittmer | F16M 11/041 | 248/637 |
| 2008/0148755 A1 * | 6/2008 | Fujii | F28F 9/0234 | 62/259.2 |
| 2008/0294309 A1 * | 11/2008 | Kaprielian | G05D 1/024 | 701/27 |
| 2009/0267540 A1 * | 10/2009 | Chemel | H05B 47/18 | 315/297 |
| 2010/0020306 A1 * | 1/2010 | Hall | H01S 5/0428 | 356/5.01 |
| 2010/0053593 A1 * | 3/2010 | Bedros | G01S 17/931 | 356/5.01 |
| 2010/0084979 A1 * | 4/2010 | Burton | F21S 45/48 | 315/82 |
| 2011/0318626 A1 * | 12/2011 | Bartenschlager | B60L 50/66 | 429/120 |
| 2012/0056057 A1 * | 3/2012 | Huang | F16M 11/2014 | 248/288.11 |
| 2012/0170029 A1 * | 7/2012 | Azzazy | H01J 31/26 | 356/139.04 |
| 2013/0005372 A1 * | 1/2013 | Strei | F28D 15/0275 | 455/500 |
| 2013/0027269 A1 * | 1/2013 | Orime | H01Q 1/521 | 343/841 |
| 2013/0038736 A1 * | 2/2013 | Yamamura | F21S 41/36 | 348/148 |
| 2013/0186601 A1 * | 7/2013 | Monson | F28D 15/0233 | 165/104.26 |
| 2013/0199770 A1 * | 8/2013 | Cherian | H01L 23/367 | 165/185 |
| 2013/0242284 A1 * | 9/2013 | Zeng | G01S 17/66 | 356/4.01 |
| 2013/0319640 A1 * | 12/2013 | Cavallaro | G06F 1/203 | 165/121 |
| 2014/0182815 A1 * | 7/2014 | Shih | H05K 7/2039 | 165/80.3 |
| 2014/0192480 A1 * | 7/2014 | Winkler | G06F 1/1632 | 361/679.47 |
| 2014/0246544 A1 * | 9/2014 | Bullard | B64G 1/50 | 244/171.8 |
| 2015/0034789 A1 * | 2/2015 | Ferguson | F16M 11/2021 | 248/371 |
| 2015/0168555 A1 * | 6/2015 | Herschbach | B60Q 1/0011 | 356/5.01 |
| 2015/0192241 A1 * | 7/2015 | Shannahan | F16M 11/043 | 248/178.1 |
| 2015/0212555 A1 * | 7/2015 | Cox | F28D 15/0275 | 361/679.52 |
| 2016/0003946 A1 * | 1/2016 | Gilliland | G01S 17/87 | 356/5.01 |
| 2016/0048363 A1 * | 2/2016 | North | G06F 1/1647 | 345/1.1 |
| 2016/0116330 A1 * | 4/2016 | Oba | G01S 7/521 | 73/632 |
| 2016/0282155 A1 * | 9/2016 | Hara | G01D 11/30 | |
| 2017/0001492 A1 * | 1/2017 | Ito | H05K 7/2039 | |
| 2017/0261450 A1 * | 9/2017 | Baarman | H01L 35/32 | |
| 2018/0073697 A1 * | 3/2018 | Brandel | F21V 25/10 | |
| 2018/0086280 A1 * | 3/2018 | Nguyen | G01S 17/931 | |
| 2018/0092253 A1 * | 3/2018 | Qiu | H05K 1/0204 | |
| 2018/0164439 A1 * | 6/2018 | Droz | G01S 17/931 | |
| 2018/0188359 A1 * | 7/2018 | Droz | G01S 17/42 | |
| 2018/0272997 A1 * | 9/2018 | Swain | G01S 7/4811 | |
| 2019/0116314 A1 * | 4/2019 | Tran | H04N 13/194 | |
| 2019/0163214 A1 * | 5/2019 | Haven | G01D 3/10 | |
| 2019/0171258 A1 * | 6/2019 | Rice | H05K 7/20854 | |
| 2019/0179381 A1 * | 6/2019 | Dede | G06F 1/26 | |
| 2019/0250251 A1 * | 8/2019 | Gibson | G01S 17/89 | |
| 2019/0257922 A1 * | 8/2019 | McCord | G01S 17/931 | |
| 2019/0353762 A1 * | 11/2019 | Kim | G01S 17/42 | |
| 2020/0300409 A1 * | 9/2020 | Hagenkamp | H04M 1/04 | |

* cited by examiner

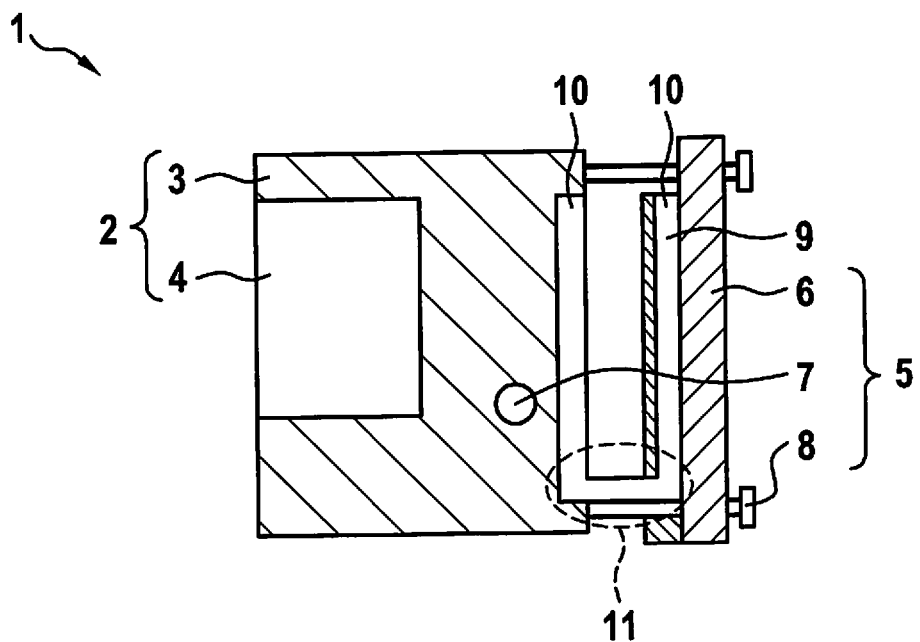
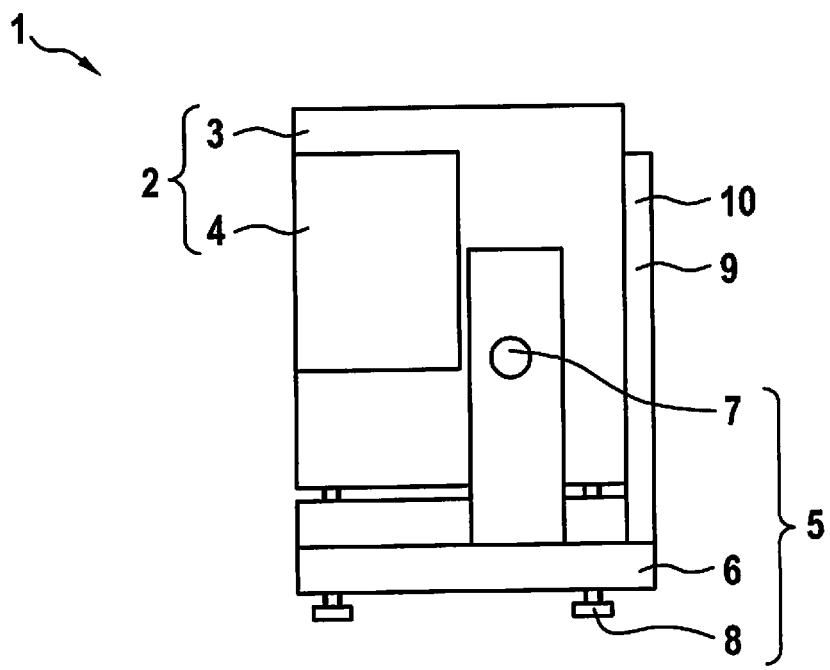

SENSOR SYSTEM FOR ATTACHING A SENSOR SET-UP TO A VEHICLE

CROSS REFERENCE

The present application claims the benefit under 35 U.S.C. § 119 of German Patent Application No. DE 102018202303.4 filed on Feb. 15, 2018, which is expressly incorporated herein by reference in its entirety.

BACKGROUND INFORMATION

The present invention relates to a sensor system for attaching a sensor set-up to a vehicle, and to a vehicle having this sensor system.

German Patent Application No. DE 101 60 935 A1 describes a motor vehicle cooling apparatus for electrical devices. In this context, at least one electrical device to be cooled is situated in the interior of a vehicle. The device includes a heat pipe, which connects the device thermally to the air-conditioning system of the vehicle.

German Patent Application No. DE 10 2010 064 343 A1 describes a method of cooling a module for a vehicle, as well as a corresponding cooling apparatus and a vehicle. In this context, the cooling apparatus includes a passive heat conductor and a heat sink in the region of the roof of the vehicle. The waste heat of the module is absorbed by the heat conductor and transported to the heat sink with the aid of the heat conductor.

SUMMARY

The present invention describes a sensor system for attaching a sensor set-up to a vehicle. The sensor set-up of the sensor system includes a housing and a sensor. In addition to the sensor set-up, the sensor system includes a connecting assembly capable of being mounted to the vehicle. The sensor set-up is fastened to the connecting assembly. In addition, the sensor system includes at least one heat pipe. The heat pipe connects the sensor set-up and the connecting assembly in a thermally conductive manner.

An advantage of an example sensor system in accordance with the present invention is that the sensor set-up may be adjusted by at least one degree of freedom with respect to the connecting assembly. Thus, after the sensor is attached, the position and/or the direction of the sensor may be changed, in order to adjust the sensing range of the sensor to the requirement.

Another advantage of an example sensor system in accordance with the present invention is that the heat of the sensor is conducted by at least one heat pipe to the connecting assembly and/or to the vehicle. Consequently, an overly high temperature of the sensor, which may result in damage to the sensor, is prevented.

According to an embodiment of the present invention, not only may the sensor be mounted to the vehicle so as to be adjustable by at least one degree of freedom, but also the heat of the sensor may simultaneously be conducted by at least one heat pipe to the connecting assembly and to the vehicle. Within the scope of the present invention, it has been recognized that in spite of its thermally conductive contact with the sensor set-up and with the connecting assembly, the heat pipe is sufficiently flexible to allow relative movement of these two set-ups with respect to each other.

The heat pipe is a component part for transporting heat from one location to another. The heat pipe may also be referred to as a thermally conductive pipe. The heat pipe is designed for a high heat-flux density, using a heat of vaporization of a medium; that is, large amounts of heat may be transported through the heat pipe on a small cross-sectional area.

Further refinements of the present invention are described herein.

It is preferably provided in accordance with the present invention that the sensor set-up be rotationally and/or slidably mounted to the connecting assembly. Because of this, the sensor set-up is rotatable and/or displaceable with respect to the stationary connecting assembly.

In particular, it is provided that the connecting assembly include at least one adjusting element for moving the sensor set-up. By adjusting the adjusting element, the sensor set-up may be adjusted rotatably and/or slidably. In addition, the sensor set-up may be held in the set position by the adjusting element.

The adjusting element preferably takes the form of an adjusting screw. The sensor set-up may be adjusted by screwing the adjusting screw in or out. In addition, the sensor set-up may be held by the adjusting screw, so that the sensor set-up may not move freely.

As an option, it is provided that the heat pipe have at least one curved region. The curved region is able to be bent in response to adjusting the sensor set-up. In this context, the heat pipe is advantageously positioned and bent in a suitable manner, so that it abuts the sensor set-up and/or the connecting assembly to produce as much contact surface as possible.

The heat pipe is preferably bent in an L-shaped manner. The L-shaped heat pipe allows two sides of the sensor set-up and the connecting assembly forming an angle with each other, to be connected thermally. The L-shaped heat pipe includes, in particular, two non-parallel arms, which are connected by the curved region.

In addition, the heat pipe may be bent in the shape of a U. The U-shaped heat pipe allows two opposite sides of the sensor set-up and the connecting assembly to be connected thermally. The U-shaped heat pipe includes, in particular, two parallel arms, which are connected by the curved region.

The heat pipe, in particular, the two arms of the U-shaped or L-shaped heat pipe, are situated preferably in a first plane. The sensor set-up is preferably movable about an axis of rotation with respect to the connecting assembly. This axis of rotation stands preferably vertically on the first plane. Due to this, a mechanical loading of the curved region of the heat pipe, which is as low as possible, is generated during adjustment.

It is preferably provided that the heat pipe abuts the housing and/or be situated in a groove of the housing, and/or be in a hole of the housing. If the heat pipe abuts the housing, then the mounting of the heat pipe is relatively simple. The heat pipe in the groove or in the hole produces a relatively greater contact surface between the heat pipe and the housing, as well as more effective protection of the heat pipe from mechanical effects.

The heat pipe preferably abuts the connecting assembly and/or is situated in a groove of the connecting assembly and/or is in a hole of the connecting assembly. If the heat pipe abuts the connecting assembly, then the mounting of the heat pipe is relatively simple. The heat pipe in the groove or in the hole produces a relatively greater contact surface between the heat pipe and the connecting assembly, as well as more effective protection of the heat pipe from mechanical influences.

The heat pipe contains, in particular, a hermetically encapsulated volume, preferably in the form of a tube. The volume of the heat pipe is filled, in particular, with a working medium, such as water or ammonia. In particular, the working medium of the heat pipe fills up a small part of the volume in the liquid state and a larger part in the vaporous state. The heat pipe includes, in particular, a vapor duct for the vaporous working medium of the heat pipe and a condensate duct for transporting the working medium back. After condensing, the working medium is transported back by gravity or capillary action. In this context, the heat pipe optionally includes a capillary structure.

The sensor preferably takes the form of an environmental monitoring sensor for monitoring a surrounding area of a vehicle. The environmental monitoring sensor is used for acquiring data about the surrounding area of the vehicle.

The environmental monitoring sensor optionally takes the form of radar, lidar, a camera, infrared sensor or ultrasonic sensor.

The sensor system may preferably include at least two of the described heat pipes. Preferably, at least two heat pipes are positioned in parallel with each other.

The present invention further includes a vehicle, preferably a road vehicle, including at least one sensor system described above. The sensor system allows flexible monitoring of the surrounding area of the vehicle. This information may be communicated to the driver via, e.g., an interface, so that the driving safety is increased. In addition, the information may be used by a driver assistance system.

BRIEF DESCRIPTION OF THE DRAWINGS

In the following, exemplary embodiments of the present invention are described in detail with reference to the figures.

FIG. 3 shows the section A-A indicated in FIG. 2.

FIG. 4 shows a schematic view of the sensor system of the present invention, according to a second exemplary embodiment.

DETAILED DESCRIPTION OF EXAMPLE EMBODIMENTS

Figure 1:
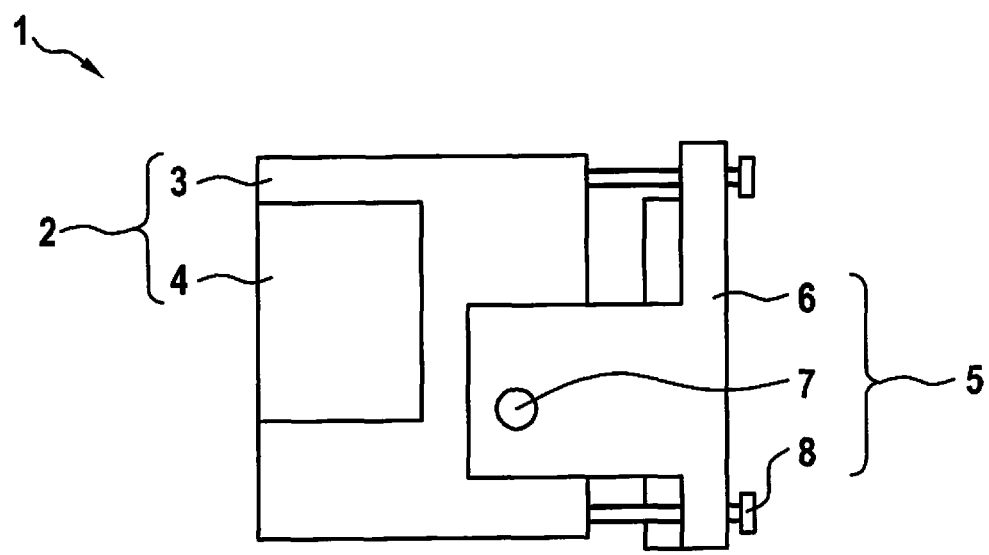
FIG. 1 shows a schematic view of a sensor system of the present invention, according to a first exemplary embodiment.

FIG. 1 shows a schematic view of a sensor system 1 according to a first exemplary embodiment. Sensor system 1 is used for attaching a sensor set-up 2 to the vehicle. To this end, sensor system 1 includes a connecting assembly 5.

Sensor set-up 2 includes a housing 3 and a sensor 4 in or on housing 3. Sensor set-up 2, in particular, housing 3, is fastened to connecting assembly 5.

Sensor set-up 2 is adjustable by one degree of freedom relative to connecting assembly 5. In the exemplary embodiment shown, sensor set-up 2 is joined to connecting assembly 5 via an axis of rotation 7 and is rotatable about this axis of rotation 7 with respect to connecting assembly 5.

In addition, FIG. 1 shows two adjusting elements 8 of sensor system 1, which take the form of adjusting screws. Sensor set-up 2 may be adjusted by screwing adjusting screws 8 in or out. The position and/or the direction of sensor 4 may be changed by adjusting these adjusting elements 8.

Sensor 4 takes the form of, in particular, an environmental monitoring sensor 4 for monitoring a surrounding area of the vehicle. Environmental monitoring sensor 4 is used for acquiring information about the surrounding area of the vehicle. Environmental monitoring sensor 4 takes the form of, in particular, radar, lidar, a camera, infrared sensor or ultrasonic sensor.

Figure 2:
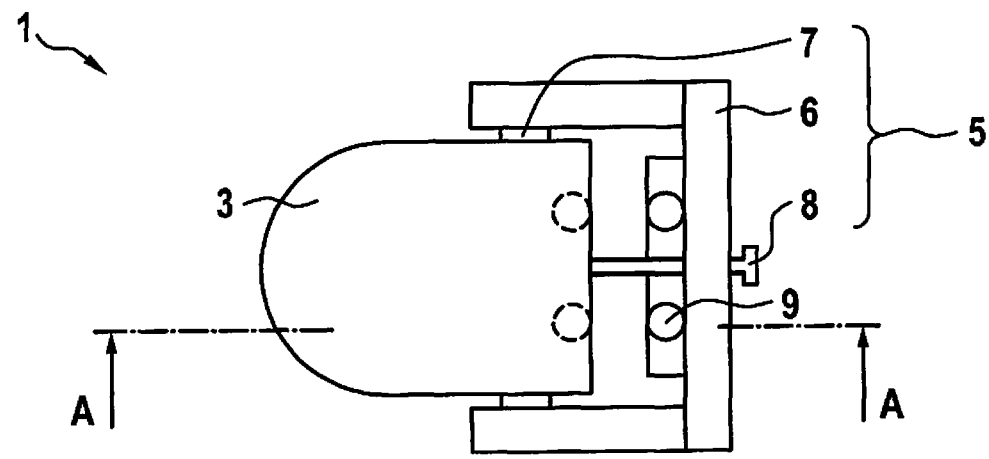
FIG. 2 shows a schematic sectional view of the sensor system of the present invention, according to the first exemplary embodiment.

FIGS. 2 and 3 show schematic sectional views of the sensor system 1 according to the first exemplary embodiment. FIG. 3 shows the section A-A indicated in FIG. 2. Two heat pipes 9 of sensor system 1 are apparent in these sectional views of FIGS. 2 and 3.

Heat pipes 9 connect sensor set-up 2, in particular, housing 3, and connecting assembly 5 in a thermally conductive manner. The heat of sensor 4 is conducted through heat pipes 9 to connecting assembly 5 and/or to the vehicle.

Heat pipes 9 each include a curved region 11. This curved region 11 is able to be bent in response to adjusting sensor set-up 2. In this context, heat pipes 9 are positioned on sensor set-up 2 and connecting assembly 5, and bent so that they abut to produce as much contact surface as possible.

Heat pipes 9 are bent in the shape of a U. U-shaped heat pipes 9 each include two parallel arms 10, which are connected by curved region 11. In this context, two opposite sides of the sensor set-up and the connecting assembly are joined thermally by U-shaped heat pipes 9.

The two arms 10 of respective U-shaped heat pipe 9 are situated in a first plane. Sensor set-up 2 is movable about axis of rotation 7, with respect to connecting assembly 5. In this context, axis of rotation 7 stands vertically on the first plane, so that the lowest possible mechanical loading of curved region 11 of heat pipe 9 occurs in response to the adjustment.

Heat pipes 9 are each in a hole of housing 3 and in a hole of connecting assembly 5.

Figure 5:
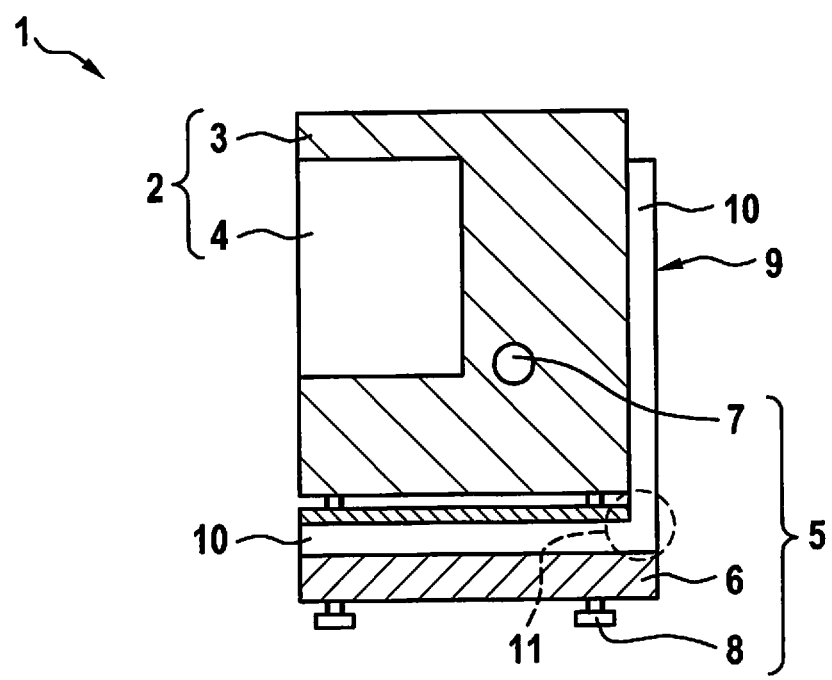
FIG. 5 shows a schematic sectional view of the sensor system of the present invention, according to the second exemplary embodiment.

FIGS. 4 and 5 show schematic views of the sensor system 1 according to the second exemplary embodiment. FIG. 5 shows a sectional view of sensor system 1 of the second exemplary embodiment. In FIGS. 4 and 5, the heat pipe 9 of sensor system 1 of the second exemplary embodiment is apparent.

In contrast to the first exemplary embodiment, the heat pipe 9 in the second exemplary embodiment is bent in the shape of an L. L-shaped heat pipe 9 includes two arms 10, which are connected by curved region 11. In this context, two sides of sensor set-up 2 and connecting assembly 5 forming an angle are connected thermally by L-shaped heat pipe 9.

The two arms 10 of L-shaped heat pipe 9 are situated in a first plane. Sensor set-up 2 is movable about axis of rotation 7, with respect to connecting assembly 5. In this context, axis of rotation 7 stands vertically on the first plane, so that the lowest possible mechanical loading of curved region 11 of L-shaped heat pipe 9 occurs in response to the adjustment.

Two or more parallel heat pipes 9 may also be used in the second exemplary embodiment.

A mounting side 6 of the connecting assembly 5 of the two exemplary embodiments is positioned, in particular, on a vehicle, preferably a road vehicle.

What is claimed is:

1. A sensor system for attaching a sensor set-up to a vehicle, comprising:

a connecting assembly mountable to the vehicle, the sensor set-up being fastened to the connecting assembly, the sensor set-up being adjustable by at least one degree of freedom with respect to the connecting assembly; and at least one heat pipe, which connects the sensor set-up and the connecting assembly in a thermally conductive manner;

wherein the sensor set-up includes a housing and a sensor;

wherein the sensor is a vehicular environmental monitoring sensor; and wherein the heat pipe includes at least one curved region, and the curved region is bendable in response to adjusting the sensor set-up.

2. The sensor system as recited in claim 1, wherein the sensor set-up is rotationally and/or slidably mounted to the connecting assembly.

3. The sensor system as recited in claim 1, wherein the connecting assembly includes at least one adjusting element for adjusting the sensor set-up.

4. The sensor system as recited in claim 3, wherein the adjusting element is an adjusting screw.

5. The sensor system as recited in claim 1, wherein the heat pipe is L-shaped or U-shaped.

6. The sensor system as recited in claim 1, wherein the heat pipe abuts the housing, and/or is situated in a groove on the housing, and/or is in a hole in the housing.

7. The sensor system as recited in claim 1, wherein the heat pipe abuts the connecting assembly, and/or is situated in a groove on the connecting assembly, and/or is in a hole in the connecting assembly.

8. The sensor system as recited in claim 1, wherein the vehicular environmental monitoring sensor is configured to monitor a surrounding area of the vehicle.

9. A vehicle, including at least one sensor system, the sensor system for attaching a sensor set-up to a vehicle, comprising:

a connecting assembly mountable to the vehicle, the sensor set-up being fastened to the connecting assembly, the sensor set-up being adjustable by at least one degree of freedom with respect to the connecting assembly; and at least one heat pipe, which connects the sensor set-up and the connecting assembly in a thermally conductive manner;

wherein the sensor set-up includes a housing and a sensor;

wherein the sensor is a vehicular environmental monitoring sensor; and wherein the heat pipe includes at least one curved region, and the curved region is bendable in response to adjusting the sensor set-up.

10. The vehicle as recited in claim 9, wherein the vehicle is a road vehicle.

11. The sensor system as recited in claim 1, wherein the vehicular environmental monitoring sensor is a radar sensor or a lidar sensor or a camera or an infrared sensor or an ultrasonic sensor.

12. The vehicle as recited in claim 9, wherein the vehicular environmental monitoring sensor is a radar sensor or a lidar sensor or a camera or an infrared sensor or an ultrasonic sensor.

13. A sensor system for attaching a sensor set-up to a vehicle, comprising:

a connecting assembly mountable to the vehicle, the sensor set-up being fastened to the connecting assembly, the sensor set-up being adjustable by at least one degree of freedom with respect to the connecting assembly; and at least one heat pipe, which connects the sensor set-up and the connecting assembly in a thermally conductive manner;

wherein the sensor set-up includes a housing and a sensor;

wherein the sensor is a vehicular environmental monitoring sensor; and wherein the heat pipe is filled with a fluid;

wherein the heat pipe includes at least one curved region, and the curved region is bendable in response to adjusting the sensor set-up.

14. The sensor system as recited in claim 13, wherein the fluid is water or ammonia.

15. The sensor system as recited in claim 13, wherein the fluid is hermetically encapsulated in the heat pipe.

16. The sensor system as recited in claim 13, wherein the vehicular environmental monitoring sensor is a radar sensor or a lidar sensor or a camera or an infrared sensor or an ultrasonic sensor.

17. The sensor system as recited in claim 13, wherein the heat pipe is L-shaped or U-shaped.

* * * * *